United States Patent
Wray

(10) Patent No.: US 9,379,994 B2
(45) Date of Patent: Jun. 28, 2016

(54) FLEXIBLE STORAGE PROVISIONING

(71) Applicant: Tier3, Inc., Bellevue, WA (US)

(72) Inventor: Jared Eugene Wray, Bothell, WA (US)

(73) Assignee: Tier 3, Inc., Bellevue, WA (US)

( * ) Notice: Subject to any disclaimer, the term of this patent is extended or adjusted under 35 U.S.C. 154(b) by 254 days.

(21) Appl. No.: 13/799,184

(22) Filed: Mar. 13, 2013

(65) Prior Publication Data

US 2013/0254383 A1    Sep. 26, 2013

Related U.S. Application Data

(60) Provisional application No. 61/614,374, filed on Mar. 22, 2012.

(51) Int. Cl.
| | |
|---|---|
| *G06F 15/173* | (2006.01) |
| *H04L 12/70* | (2013.01) |
| *H04L 12/911* | (2013.01) |
| *H04L 29/08* | (2006.01) |
| *G06F 9/50* | (2006.01) |

(52) U.S. Cl.
CPC ............. *H04L 47/70* (2013.01); *G06F 9/5088* (2013.01); *H04L 67/1097* (2013.01)

(58) Field of Classification Search
CPC .... H04L 47/70; H04L 67/1097; G06F 9/5088
USPC .......................................................... 709/224
See application file for complete search history.

(56) References Cited

U.S. PATENT DOCUMENTS

| | | | |
|---|---|---|---|
| 7,624,176 B2 | 11/2009 | Dickerson et al. | |
| 7,711,751 B2 | 5/2010 | Kelley | |
| 7,856,530 B1 | 12/2010 | Mu | |
| 8,108,868 B2 | 1/2012 | Toub | |
| 8,140,812 B2* | 3/2012 | Arroyo | G06F 9/455 709/216 |
| 8,260,831 B2* | 9/2012 | Tyrrell | G06F 17/30067 707/823 |
| 8,296,544 B2* | 10/2012 | Beniyama | G06F 3/0608 711/170 |
| 8,386,731 B2* | 2/2013 | Mashtizadeh et al. | 711/162 |
| 8,589,538 B2* | 11/2013 | Bargoti | G06F 3/061 709/224 |

(Continued)

OTHER PUBLICATIONS

International Search Report and Written Opinion for International Application No. PCT/US2013/031026 mailed Jun. 3, 2013.

(Continued)

*Primary Examiner* — Joseph E Avellino
*Assistant Examiner* — Binod J Kunwar
(74) *Attorney, Agent, or Firm* — John W. Branch; Lowe Graham Jones PLLC

(57) ABSTRACT

Embodiments may enable enterprise cloud based computing infrastructures to instantiate child virtual machines that may be linked to parent virtual machines where the child virtual machines and the parent virtual machines share storage that resides on a high-speed storage area network. Performance metrics of the child virtual machines may be monitored and collected for a period of time generating performance characteristics of the child virtual machines. In at least one of the various embodiments, if the monitoring period may have expired that child virtual machine may be moved to a storage pool that may be selected based on the performance characteristics of the child virtual machine. In at least one of the various embodiments, if the child virtual may be moved from the high-speed SAN to a storage pool the linked between the child virtual machine and the parent virtual machine may be broken.

18 Claims, 8 Drawing Sheets

(56) References Cited

U.S. PATENT DOCUMENTS

| | | | |
|---|---|---|---|
| 8,650,299 B1* | 2/2014 | Huang | H04L 67/1002 709/226 |
| 8,756,609 B2 | 6/2014 | Dasgupta et al. | |
| 8,886,788 B2* | 11/2014 | Tung | G06F 9/5072 709/224 |
| 9,286,182 B2* | 3/2016 | Fries | G06F 11/301 |
| 2004/0148479 A1* | 7/2004 | Patel et al. | 711/163 |
| 2005/0102674 A1 | 5/2005 | Tameshige et al. | |
| 2007/0074208 A1* | 3/2007 | Ling | G06F 9/45558 718/1 |
| 2009/0037680 A1* | 2/2009 | Colbert et al. | 711/162 |
| 2009/0116389 A1 | 5/2009 | Ji et al. | |
| 2010/0082321 A1 | 4/2010 | Cherkasova et al. | |
| 2010/0083248 A1 | 4/2010 | Wood et al. | |
| 2010/0191845 A1* | 7/2010 | Ginzton | G06F 9/4856 709/224 |
| 2010/0199276 A1* | 8/2010 | Umbehocker | G06F 3/0604 718/1 |
| 2010/0250499 A1* | 9/2010 | McAlister | G06F 11/1471 707/679 |
| 2010/0250748 A1* | 9/2010 | Sivasubramanian | G06F 9/5016 709/226 |
| 2010/0306767 A1* | 12/2010 | Dehaan | 718/1 |
| 2010/0325197 A1* | 12/2010 | Heim | G06F 9/455 709/203 |
| 2011/0055377 A1* | 3/2011 | Dehaan | G06F 9/4856 709/224 |
| 2011/0072208 A1* | 3/2011 | Gulati et al. | 711/114 |
| 2011/0078303 A1* | 3/2011 | Li | G06F 9/505 709/224 |
| 2011/0142064 A1 | 6/2011 | Dubal et al. | |
| 2011/0145153 A1 | 6/2011 | Dawson et al. | |
| 2011/0213875 A1* | 9/2011 | Ferris et al. | 709/224 |
| 2011/0214005 A1* | 9/2011 | Biran | G06F 11/008 714/1 |
| 2011/0225017 A1 | 9/2011 | Radhakrishnan | |
| 2011/0249871 A1 | 10/2011 | Zamora Cura | |
| 2011/0258621 A1* | 10/2011 | Kern | 718/1 |
| 2011/0295999 A1* | 12/2011 | Ferris et al. | 709/224 |
| 2011/0307486 A1* | 12/2011 | Breslau | G06F 21/6245 707/737 |
| 2011/0307573 A1* | 12/2011 | Lingafelt et al. | 709/217 |
| 2012/0054280 A1* | 3/2012 | Shah | 709/205 |
| 2012/0066371 A1 | 3/2012 | Patel et al. | |
| 2012/0131594 A1 | 5/2012 | Morgan | |
| 2012/0173709 A1 | 7/2012 | Li et al. | |
| 2013/0054776 A1 | 2/2013 | Kunze et al. | |
| 2013/0086273 A1 | 4/2013 | Wray et al. | |

OTHER PUBLICATIONS

International Search Report and Written Opinion for International Application No. PCT/US2013/031046 mailed May 30, 2013.

International Search Report for International Application No. PCT/US2012/058776 mailed Mar. 26, 2013.

Office Communication for U.S. Appl. No. 13/645,073 mailed on Aug. 20, 2014.

Office Communication for U.S. Appl. No. 13/645,073 mailed on Jan. 9, 2015.

Office Communication for U.S. Appl. No. 13/799,750 mailed on Dec. 17, 2014.

Office Communication for U.S. Appl. No. 13/645,073 mailed on Mar. 23, 2015.

Office Communication for U.S. Appl. No. 13/645,073 mailed on Jul. 14, 2015, 30 pages.

Office Communication for U.S. Appl. No. 13/645,073 mailed on Nov. 23, 2015, 34 pages.

Office Communication for U.S. Appl. No. 13/799,750 mailed on May 12, 2015, 25 pages.

Office Communication for U.S. Appl. No. 13/799,750 mailed on Jul. 28, 2015, 7 pages.

Office Communication for U.S. Appl. No. 13/799,750 mailed on Sep. 17, 2015, 31 pages.

Office Communication for U.S. Appl. No. 13/799,750 mailed on Feb. 10, 2016, 33 pages.

Office Communication for U.S. Appl. No. 13/645,073 mailed on Feb. 17, 2016, 17 pages.

* cited by examiner

Per second sum of disk size growth:

$$DiskGrowth = \int_{0}^{86400} ((DiskSize_t - DiskSize_{t-1})/t)dt \quad \Big\} \; 602$$

Per second sum of disk input:

$$DiskInput = \int_{0}^{86400} ((Input_t - Input_{t-1})/t)dt \quad \Big\} \; 604$$

Per second sum of disk output:

$$DiskOutput = \int_{0}^{86400} ((Output_t - Output_{t-1})/t)dt \quad \Big\} \; 606$$

Per second sum of CPU usage:

$$CPU = \int_{0}^{86400} ((Usage_t - Usage_{t-1})/t)dt \quad \Big\} \; 608$$

Per second sum of Memory usage:

$$Memory = \int_{0}^{86400} ((MemorySize_t - MemorySize_{t-1})/t)dt \quad \Big\} \; 610$$

*FIG. 6*

FLEXIBLE STORAGE PROVISIONING

CROSS REFERENCE TO RELATED APPLICATIONS

This application claims the benefit of U.S. Provisional Application, titled "Flexible Storage Provisioning," Ser. No. 61/614,374 filed on Mar. 22, 2012, the benefit of which is hereby claimed under 35 U.S.C. §119(e), and which is further incorporated herein by reference.

TECHNICAL FIELD

Embodiments relate generally to managing computing resources made available to applications and processes executing in enterprise cloud based environments. In particular, embodiments may be related to deploying virtual machines in a cloud based environment.

BACKGROUND

Applications and processes executing in enterprise cloud based environments may be hindered because of the lack of flexible resource scaling and provisioning of resources. Applications and processes executing in the cloud may have to adapt to varying resource requirements based on customer and business needs. Provisioning computing storage resources at the time usage demand increases may be inefficient because it may take significant time and resources to allocate and initialize the storage which may cause service interruptions. Thus, operators may be faced with the choice of expensive over-provisioning of computers resources, or reactively provisioning computer resources when demand increases occur which may result in poor service response and unplanned downtime. Further, some resources, such as virtual machine data storage, may have provisioning characteristics where reactive provisioning may cause significant negative impact on system performance. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein:

FIG. 6 shows a table of formulas for calculating virtual machine performance characteristics in accordance with at least one of the various embodiments;

DETAILED DESCRIPTION OF THE EMBODIMENTS

Figure 1:
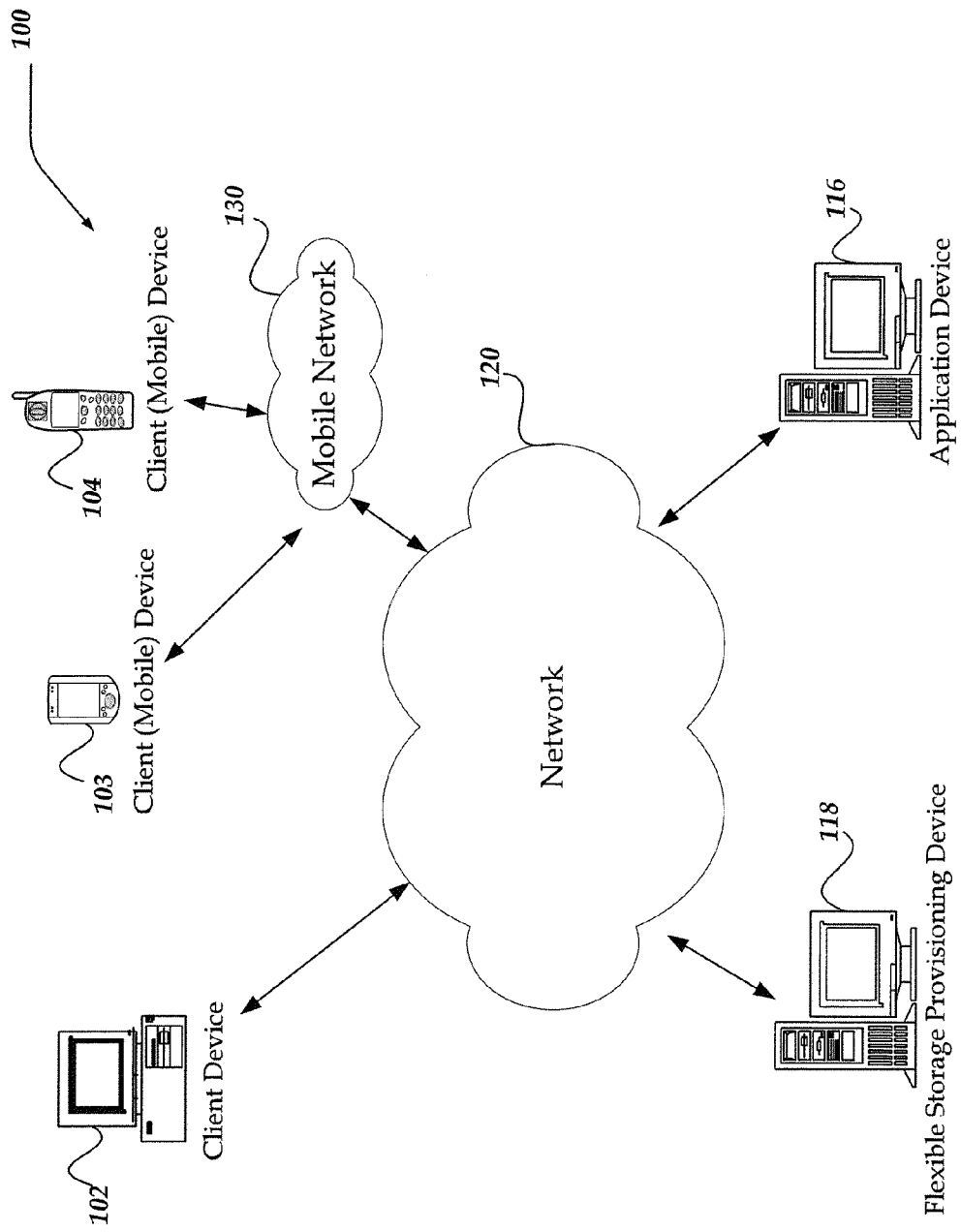
FIG. 1 illustrates an overview of a system in which various embodiments may be practiced.

Various embodiments now will be described more fully hereinafter with reference to the accompanying drawings, which form a part hereof, and which show, by way of illustration, specific exemplary embodiments by which the claimed innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrases "in one embodiment" and "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the various embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

The term "virtual machine" as used herein refers to a virtualized machine that may be operative in a virtualized computing environment within and/or under the management of a hypervisor. In at least one of the various embodiments, the virtualized computing environment may be a cloud computing environment.

The term "performance profile" as used herein refers to a collection of one or more performance characteristic that may be used to classify the operational characteristics of virtual machines and/or storage pools. It may include one or more performance characteristic related to various network devices, network device components (CPU, memory, disk drive), software programs, networks, or the like. Performance characteristics may be collected by direct monitoring of logging and feeds from servers, applications, virtual machines, hypervisors, or the like, and may include third-party agents that may be installed on a monitored computing resource. Also, performance characteristics that comprise a performance profile may be collected using advanced monitoring techniques external to the computing resources being monitor, or the like.

Briefly stated, at least one of the various embodiments may enable enterprise cloud based computing infrastructures to instantiate child virtual machines that may be linked to parent virtual machines where the child virtual machines and the parent virtual machines share storage that resides on a high-speed storage area network.

In at least one of the various embodiments, a monitoring application may monitor a plurality of storage pools to determine a storage pool performance profile for each monitored storage pool. In at least one of the various embodiments, at least one child virtual machine (VM) may be cloned from a parent VM such that may be linked with parent VM.

In at least one of the various embodiments, at least one performance characteristic of the child VM may be monitored for a defined time period to determine a child VM performance profile for the child VM. If the defined monitoring time period expires, the system may compare the child VM performance profile with each determined storage pool performance profile. Based on this comparison a destination storage pool may be determined for the child VM. If a destination storage pool has been determined, the child VM may be unlinked from the parent VM and moved to the destination storage pool.

In at least one of the various embodiments, linking the child VM to the parent VM may enable the sharing of at least some of the storage allocated to the parent VM with child VM. Also, in at least one of the various embodiments, linking may enable the child VM to share some or all of the applications that may be on the parent VM.

In at least one of the various embodiments, the system may classify the storage pools based on or one more monitored performance characteristics and/or performance profiles. The storage pools may be ranked and/or classified based on performance (e.g., high-speed, medium-speed, slow-speed, or the like).

In at least one of the various embodiments, monitoring the child VM, may further comprise, monitoring at least one performance metric, wherein the at least one performance metric includes at least one of a per second sum of disk growth, a per second sum of disk input, or a per second sum of disk output.

In at least one of the various embodiments, if a child VM is no longer in use, it may be deleted instead of being moved to a destination storage pool.

Illustrative Operating Environment

FIG. 1 illustrates an embodiment of a system in which embodiments of the present invention may operate. However, not all of the components in the depicted system may be required to practice the invention, and variations in the arrangement and type of the components may be made without departing from the spirit or scope of the invention.

As shown in the figure, system 100 includes client device(s) 102, mobile (client) devices 103-104, network 120, mobile network 130, one or more flexible storage provisioning devices 118. Network 120 is in communication with and enables communication between each of the elements of system 100. Mobile network 130 further enables telephonic communication with wireless communication devices such as mobile device 104. Also, system 100 includes one or more application devices 116.

Client devices 102-104 may include virtually any computing device capable of receiving and sending a message over a network, and/or to and from another computing device. The set of such client devices may include devices that typically connect to a network using a wired communications medium such as personal computers, tablet computers, multiprocessor systems, microprocessor-based or programmable consumer electronics, network PCs, and the like. Further, client devices 102-104 may include any mobile device that is also, or instead, capable of connecting to a network via a wireless communication signal such as a personal digital assistant (PDA), pocket PC, wearable computer, portable computing device, tablet computing device, mobile computing device, cell phones, smart phones, pagers, walkie talkies, radio frequency (RF) devices, infrared (IR) devices, citizen band (CB) radio devices, or any other device that is equipped to communicate over a wireless communication medium. Client devices may also include integrated devices combining one or more of the preceding devices and/or elements of one or more of these devices.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like. Client devices 102-104 may further include a voice over IP (VOIP) application that enables voice communication over network 120 separate from mobile network 130.

Network 120 is configured to couple one computing device to another computing device, enabling them to communicate. Network 120 is enabled to employ any form of medium for communicating information from one electronic device to another. Also, network 120 may include a wireless interface, and/or a wired interface, such as the Internet, Cloud Computing, and the like, in addition to local area networks (LANs), wide area networks (WANs), direct connections, such as through a universal serial bus (USB) port, other forms of communication medium, or any combination thereof. On an interconnected set of LANs, including those based on differing architectures and protocols, a router, switch and/or other network appliance may act as a link between LANs, enabling messages and data to be sent from one to another. Also, communication links within LANs may include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 120 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), wide code division multiple access (WCDMA), high speed downlink packet access (HSDPA), long term evolution (LTE), ultra wide band (UWB), IEEE 802.16 Worldwide Interoperability for Microwave Access (WiMax), Wi-Fi IEEE 802.11, and the like. In essence, network 120 includes any communication method by which information may travel between the various devices of system 100. Network 120 may further include one or more network management devices, which may include network providers, load balancers, application managers, or the like. Network management devices may manage communication sessions, tag communication traffic, place data cookies on client devices, and perform other network management operations.

Mobile network 130 may include wireless interfaces, wireless forms of communication, and/or wireless links such as cellular networks, satellite links, Infra-Red, Micro-Wave links, Open Air Laser links, and the like. These wireless links may include various mobile communication protocols such as wireless application protocol (WAP), global system for mobile communications (GSM), code division multiple access (CDMA), wide code division multiple access (WCDMA), long term evolution (LTE), high speed downlink packet access (HSDPA), time division multiple access (TDMA), general packet radio service (GPRS), ultra wide band (UWB), IEEE 802.16 Worldwide Interoperability for Microwave Access (WiMax), Wi-Fi IEEE 802.11, and the like.

The communication media used to transmit information in mobile communication links as described above may generally include any communication media that is processor readable by a computing device. Such media may include any processor readable non-transitory storage media. Processor readable media may also include transitory wired and/or wireless communication media, or any combination thereof. Additionally, processor-readable media typically embodies computer-readable instructions, data structures, program modules, or other data. Such data may be stored on the processor readable non-transitory storage media. Such data may also be communicated through a communication medium in a modulated data signal such as a carrier wave, data signal, or other transport mechanism and can include any type of data. The signal can have one or more of its characteristics set or changed in such a manner as to encode information, instructions, data, and the like. By way of example, communication media includes wireless media such as fluids or space for acoustic, RF, microwave, infrared, free space laser, and other wireless signals, and wired media such as twisted pair, coaxial cable, fiber optics, wave guides, and other wired media.

Flexible storage provisioning device(s) 118 and application device(s) 116 may comprise multiple computing devices, components of a single computing device, or a single device with multiple software features. In some embodiments, flexible storage provisioning device (s) 118 and/or application device(s) may comprise a cluster of network devices, such that functionality is shared among the network devices of the cluster in a load-balanced and/or parallel processing. In some embodiments, system 100 may include load balancers (not shown) or other network devices that manage the load balancing of tasks among flexible storage provisioning device (s) 118 and/or application device(s) respectively.

In some embodiments, flexible storage provisioning device (s) 118 and application device(s) 116 may use external data storage for storing data. The stored data may include web sites, databases, log files, online journals (e.g., blogs), photos, reviews, and information regarding online services such as messaging, search, news, shopping, advertising, travel services, or virtually any other type of data. Additionally, in some embodiments, a user of client devices 102-104 may access data and application(s) installed on flexible storage provisioning device (s) 118 and application device(s) 116.

Figure 2:
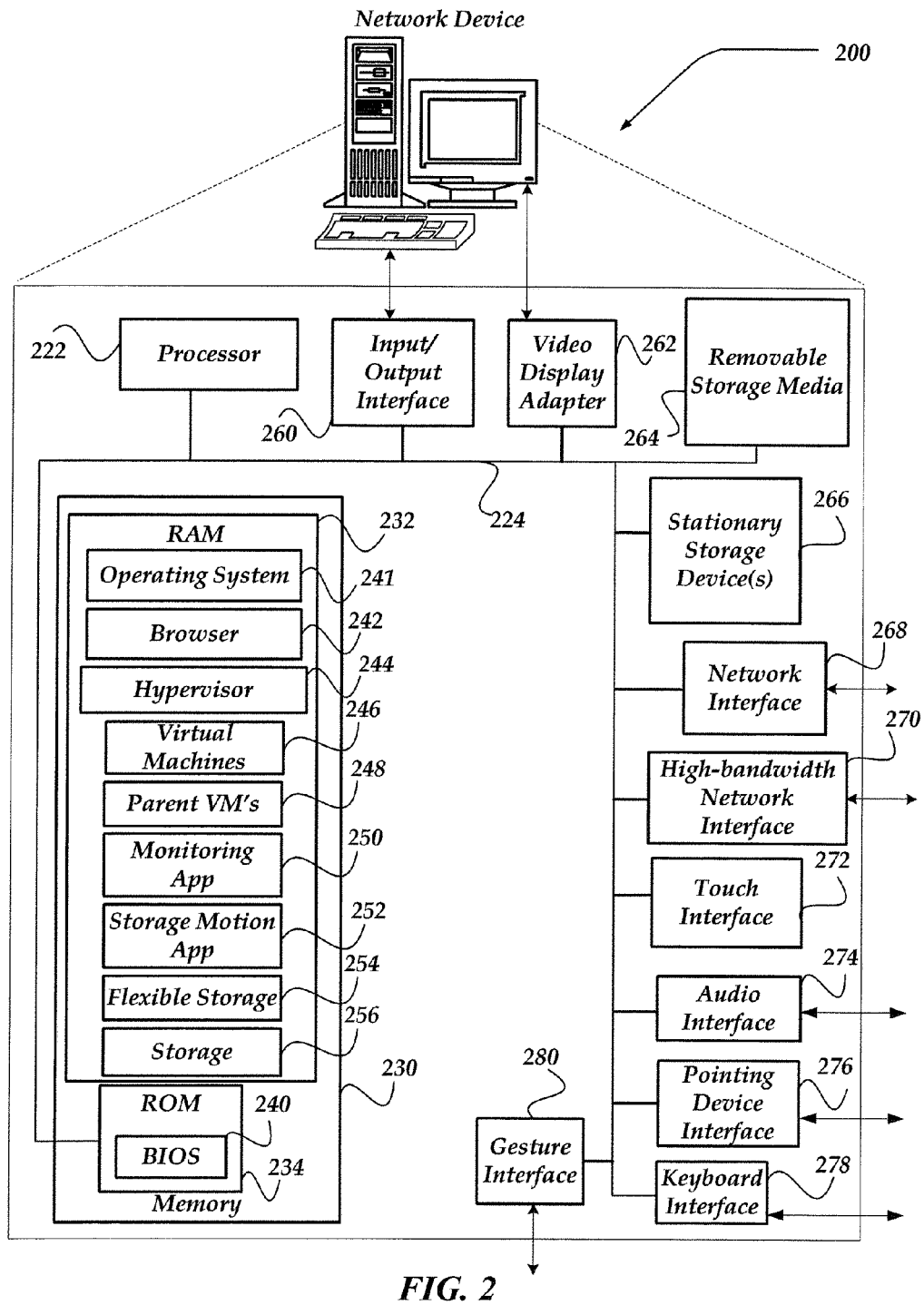
FIG. 2 shows a network device that may be arranged to perform actions in accordance with the embodiments.

FIG. 2 shows one embodiment of a network device, according to at least one of the embodiments. Network device 200 may include many more, or fewer, components than those shown. The components shown, however, are sufficient to disclose an illustrative embodiment. Network device 200 may represent, for example, flexible storage provisioning device 118 and Application Device 116 of FIG. 1.

As shown in FIG. 2, network device 200 includes processor 222 in communication with mass memory 230 via bus 224. Mass memory 230 may include RAM 232, ROM 234, and other memory storage means. Mass memory 230 illustrates an example of computer readable storage media for storage of data such as computer readable instructions, data structures, program modules or other data. Mass memory stores a basic input/output system ("BIOS") 240 for controlling low-level operation of network device 200. The mass memory also stores an operating system 241 for controlling the operation of network device 200. It should be appreciated that this component may include a general purpose operating system such as a version of Apple Mac OS®, Microsoft Windows®, UNIX, or LINUX®, or a specialized mobile communication operating system such as Apple iOS®, Google Android®, Microsoft Windows Mobile™, the Symbian® operating system, and the like. The operating system may include, or interface with a Java® virtual machine module that enables control of hardware components and/or operating system operations via Java application programs.

Memory 230 can be utilized by network device 200 to store programs, applications, software modules, and the like, as well as the data used by such programs, applications, and/or software modules. Applications may comprise processor executable instructions which can be executed by network device 200. Programs in mass memory 230 may include a browser application 242. Browser 242 may run under the control of operating system 241 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web. Mass memory 230 may also include hypervisor 244 that may manage one or more virtual machines 246, including one or more parent virtual machine's 248. In at least one of the various embodiments, mass memory 230 may also include monitoring application 250, storage motion application 252, flexible storage 254, and storage 256.

Mass memory 230 may also include other applications that are not shown. Other examples of applications include content management applications, messaging applications, schedulers, calendars, web services, transcoders, database programs, word processing programs, spreadsheet programs, and so forth. Accordingly, some of these applications may process images, audio, video, or markup pages, enable telecommunication with another user of another electronic device, and/or other services.

Network device 200 also includes an input/output interface 260 for communicating with input/output devices such as a Joystick, wheel, rocker switches, keypad, printer, scanner, modem, video camera, modem, and/or other input devices not specifically shown in FIG. 2. A user of network device 200 can use input/output devices to interact with a user interface that may be separate or integrated with operating system 241, and/or programs in memory 230. Interaction with the user interface includes visual interaction via a display coupled to video display adapter 262. The user interface can also include gesture interface 280, touch interface 272, pointing device interface 276, keyboard interface 278, and audio interface 274.

Network device 200 may include removable storage media 264 and stationary storage device(s) 266. Removable storage media 264 can comprise one or more of an optical disc drive, flash memory drive, hard drive, a floppy disk drive, tape drive, and/or any other type of processor readable non-transitory storage media. Stationary storage device 266 or removable storage media 264 may include any method or technology for processor readable non-volatile storage of data, such as processor readable instructions, data structures, program modules, text, or other data. Examples of processor readable non-volatile storage media include a CD-ROM, digital versatile disks (DVD) or other optical storage, magnetic cassettes, magnetic tape, magnetic disk storage or other magnetic storage devices, RAM, ROM, EEPROM, flash memory, flash drives or other memory technology, hard disk drives, or any other media which can be used to store data that can be accessed by a computing device.

Via a network communication interface unit 268, network device 200 can communicate with a communication protocol, such as Ethernet and the like, with a wide area network such as the Internet, Cloud Network, a local area network, a wired telephone network, a cellular telephone network, or some other communications network, such as networks 120 and/or mobile network 130 in FIG. 1. Additionally, high bandwidth network interface 270 is provided to enable network device 200 to communicate with other co-located network devices at vastly greater speeds than network interface 268. For example, network device 200 may be physically embodied on a "blade" or card in a chassis that supports the operation of several co-located blades and provides access to a high bandwidth network backplane for the network devices to communicate particular information between each other over high bandwidth network interface 270.

Figure 3:
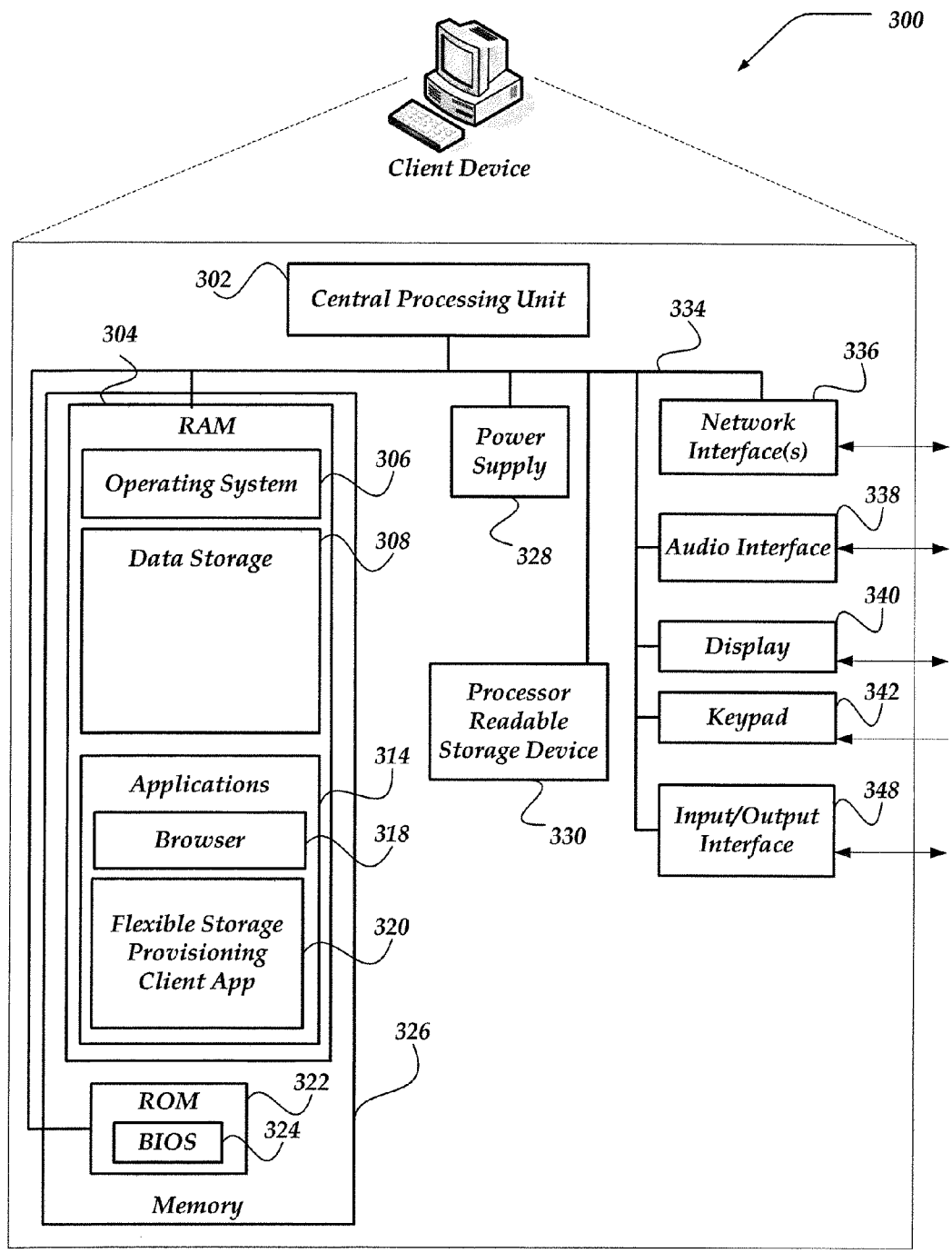
FIG. 3 shows a network device that may be arranged to perform actions in accordance with the embodiments.

FIG. 3 shows one embodiment of client device 300 that may be included in a system implementing at least one of the various embodiments. Client device 300 may include many more or less components than those shown in FIG. 3. However, the components shown are sufficient to disclose an illustrative embodiment for practicing the present invention. Client device 300 may represent, for example, one embodiment of at least one of client devices 102-104 of FIG. 1.

As shown in the figure, client device 300 includes a central processing unit ("CPU") 302 in communication with a mass memory 326 via a bus 334. Client device 300 also includes a power supply 328, one or more network interfaces 336, an audio interface 338, a display 340, a keypad 342, and an input/output interface 348. Power supply 328 provides power to client device 300. A rechargeable or non-rechargeable battery may be used to provide power. The power may also be provided by an external power source, such as an AC adapter or a powered docking cradle that supplements and/or recharges a battery.

Client device 300 may optionally communicate with a base station (not shown), or directly with another computing device. Network interface 336 includes circuitry for coupling client device 300 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 336 is sometimes known as a transceiver, transceiving device, or network interface card ("NIC").

Audio interface 338 may be arranged to produce and receive audio signals such as the sound of a human voice. For example, audio interface 338 may be coupled to a speaker and microphone (not shown) to enable telecommunication with others and/or generate an audio acknowledgement for some action. Display 340 may be a liquid crystal display ("LCD"), gas plasma, light emitting diode ("LED"), or any other type of display used with a computing device. Display 340 may also include a touch sensitive screen arranged to receive input from an object such as a stylus or a digit from a human hand.

Keypad 342 may comprise any input device arranged to receive input from a user. For example, keypad 342 may include a push button numeric dial, or a keyboard. Keypad 342 may also include command buttons that are associated with selecting and sending images.

Client device 300 also comprises input/output interface 348 for communicating with external devices, such as a headset, or other input or output devices not shown in FIG. 3. Input/output interface 348 can utilize one or more communication technologies, such as USB, infrared, Bluetooth™, or the like.

Mass memory 326 includes a Random Access Memory ("RAM") 304, a Read-only Memory ("ROM") 322, and other storage means. Mass memory 326 illustrates an example of computer readable storage media (devices) for storage of information such as computer readable instructions, data structures, program modules or other data. Mass memory 326 stores a basic input/output system ("BIOS") 324 for controlling low-level operation of client device 300. The mass memory also stores an operating system 306 for controlling the operation of client device 200. It will be appreciated that this component may include a general-purpose operating system such as a version of UNIX, or LINUX™, or a specialized client communication operating system such as Windows Mobile™, Google Android™, Apple iOS™, or the Symbian® operating system. The operating system may include, or interface with a Java virtual machine module that enables control of hardware components and/or operating system operations via Java application programs.

Mass memory 326 further includes one or more data storage 308, which can be utilized by client device 300 to store, among other things, applications 314 and/or other data. For example, data storage 308 may also be employed to store information that describes various capabilities of client device 300. The information may then be provided to another device based on a variety of events, including being sent as part of a header during a communication, sent upon request, or the like. At least a portion of the information may also be stored on a disk drive or other computer-readable storage device (not shown) within client device 300. In one of the various embodiments, data storage 308 may store data associated with web scaling applications generated in part by flexible storage provisioning device 118.

Applications 314 may include computer executable instructions which, when executed by client device 300, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 314 may include, for example, browser 318 and flexible storage provisioning client application 320.

Browser 318 may include virtually any application configured to receive and display graphics, text, multimedia, and the like, employing virtually any web based language. In at least one of the various embodiments, the browser application is enabled to employ HDML, WML, WMLScript, JavaScript, SGML, HTML, XML, and the like, to display and send a message. However, any of a variety of other web-based languages may be employed. In one embodiment, browser 318 may enable a user of client device 300 to communicate with another network device, such as flexible storage provisioning device 118 of FIG. 1. In one embodiment, browser 318 may enable a user to view and/or manipulate applications that may be operating on flexible storage provisioning device 118.

Illustrative Logical Architecture

Figure 4:
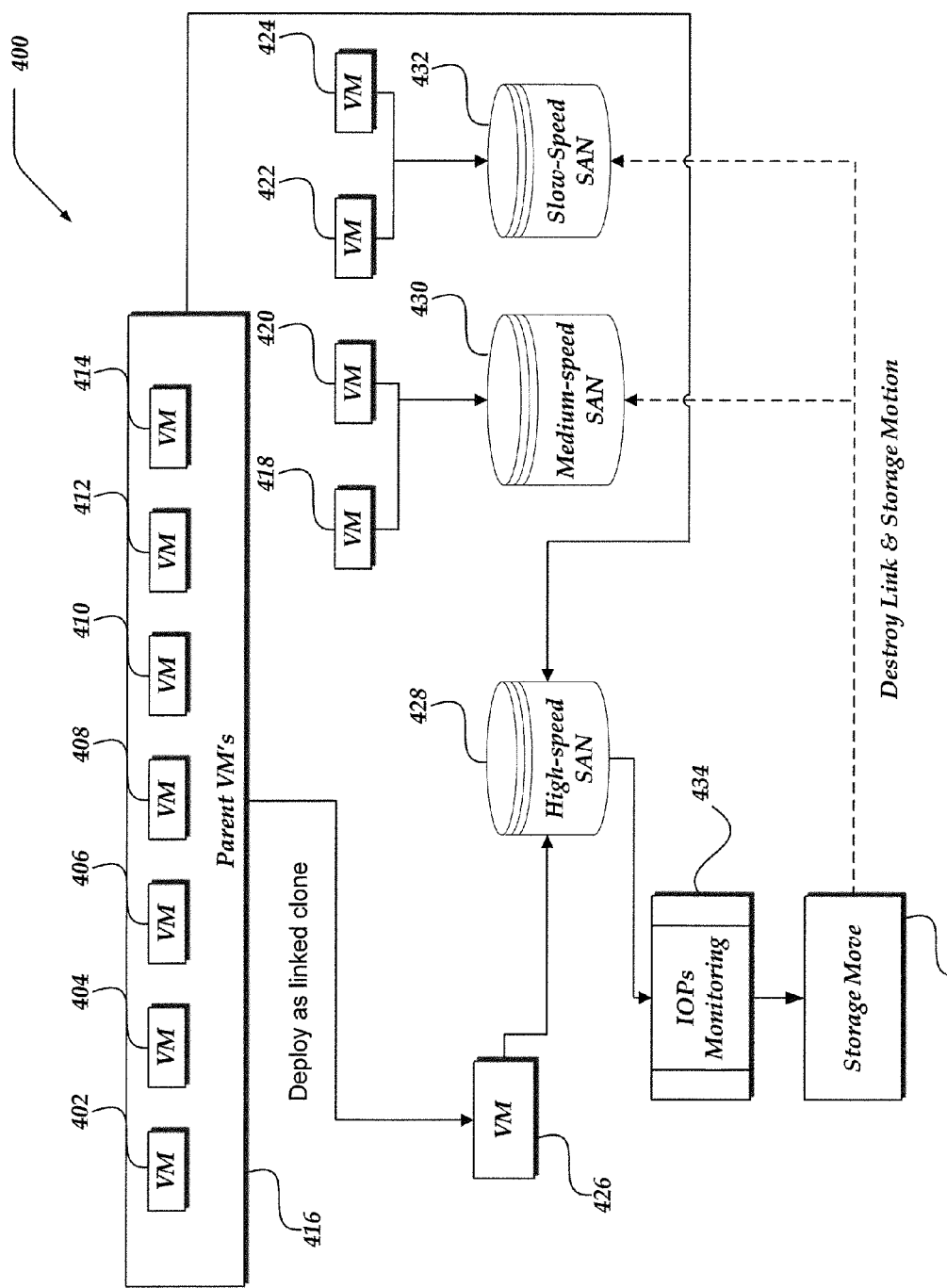
FIG. 4 shows an overview of a system adapted to perform actions in accordance with the embodiments.

FIG. 4 shows an overview of system 400 for flexible storage provisioning for virtual machines that may operating in a virtualized environment, such as a cloud computing environment, in accordance with at least one of the various embodiments.

In at least one of the various embodiments, a cloud computing environment may include one or more storage pools that may be classified using performance profiles that may be based on one or more performance characteristics. In this example, there are three storage pools, high-speed SAN 428, medium-speed SAN 430, and slow-speed SAN 432.

In at least one of the various embodiments, parent virtual machines 402-414 may be operative within cloud computing environment 416. In this example, these parent virtual machines (virtual machines 402-414) may be assigned used storage partition that may be located on high-speed SAN 428.

In at least one of the various embodiments, virtual machine 426 may be a newly provisioned virtual machine that may be cloned from one of the parent virtual machines. Virtual machine 426 may be sharing the storage of its parent virtual machine. Accordingly, virtual machine 426 may be assigned storage that is located on high-speed SAN 428.

In at least one of the various embodiments, during a defined initial time period of operation performance metrics of virtual machine 426 may be monitored by one or more monitoring systems, such as, input/output performance (IOP) monitor 434.

In at least one of the various embodiments, from the monitored performance metrics a performance profile may be compiled.

In at least one of the various embodiments, IOP monitor 434 may enable storage move application 436 to move virtual machine 426 to a storage pool that may have a performance profile that is consistent with the performance profile of virtual machine 426.

Further, in this example, virtual machine 418 and virtual machine 420 are shown as being assigned to storage pool medium-speed SAN 430. Thus, the performance profiles corresponding to virtual machine 418 and virtual machine 420 may match well with the performance profile of medium-speed SAN 430. Likewise, in this example, the performance profiles corresponding to virtual machine 422 and virtual machine 424 may match well with the performance profile of medium-speed SAN 432.

In at least one of the various embodiments, a cloud-based computing environment may be arranged to have multiple storage pools for storing data that may be associated with one or more virtual machines that may be operating in a cloud computing environment. In at least one of the various embodiments, storage pools may be classified based on one or more performance characteristics of the storage pool, such as, latency, capacity, availability, geographic location, I/O throughput (e.g., bandwidth), or the like. Also, in at least one of the various embodiments, other features associated with the storage pools may be used, such as, on-board buffer capacity, redundancy, file systems (e.g., FAT32, NTFS, ReFS, XFS, ZFS, or the like), journaling/backup procedures, or the like.

In at least one of the various embodiments, virtual machines may have a performance profile that may indicate that a particular classification of storage pools may be appropriate for a virtual machine. Additionally, in at least one of the various embodiments, business considerations, such as cost, may influence the determination of an appropriate storage pool for a particular virtual machine.

In some cases, identifying the appropriate storage pool to associate with a new virtual machine may be difficult because the performance characteristics of the new virtual machine may be unknown. Also, in some cases, moving a virtual machine and its associated data storage from one storage pool to another may be a resource intensive operation that may impact the virtual machine being moved as well as other virtual machines operating in the same cloud computing environment. Further, in some cases, operating a virtual machine using a storage pool that may be poorly matched to the performance profile of the virtual machine may lead to poor performance and/or unnecessary storage expense. For example, allocating storage for a virtual machine on a storage pool having performance characteristics that are in excess of what is needed may be more expensive than using a storage pool having performance characteristics closer matched to the actual performance requirements of the virtual machine.

In at least one of the various embodiments, some virtual machines may be designated as parent virtual machines. In at least one of the various embodiments, parent virtual machines may comprise vanilla virtual machines based on various operating systems, such as, Windows®, Windows Server®, Linux®, Android™, or the like. In at least one of the various embodiments, parent virtual machines may be virtual machines comprising an installed "vanilla" operating system absent customization or additional special purpose applications installed.

In at least one of the various embodiments, non-vanilla parent virtual machines may be designated based on virtual machines comprising operating systems that may have been customized, and/or have special purpose software installed. In at least one of the various embodiments, parent virtual machines may be arranged to use storage from one or more high-speed storage pools (e.g., a high-speed SAN).

In at least one of the various embodiments, users may create new child virtual machines based on one of the available parent virtual machines. In at least one of the various embodiments, if created, child virtual machines may be linked to their corresponding parent virtual machines. In at least one of the various embodiments, at least one aspect of child virtual machines being linked to parent virtual machines may be that the child virtual machines share the data storage of parent virtual machines. In at least one of the various embodiments, at least one aspect of linking the child virtual machine with its parent virtual machine may be that the child virtual machine may be made available for use faster than if the storage for the new child virtual machine had to be allocated and installed into a storage pool at the time the child virtual machine was created.

In at least one of the various embodiments, the parent virtual machines may be allocated storage on a high-speed storage area network (SAN). In at least one of the various embodiments, using the high-speed SAN may enable fast spin-up of the new child virtual machines and/or the new child virtual machines may have access to a high-performance storage pool. In at least one of the various embodiments, giving new child virtual machines access to a high performance storage pool may ensure that the child virtual machine may be associated with a storage pool that may meet or exceed the performance characteristics of the child virtual machine.

In at least one of the various embodiments, the high-speed SAN providing the storage pool for the parent virtual machines and the new child virtual machines may be instrumented with one or more monitors to generate performance profiles based on the collection a variety of performance metrics that may be related to the performance of the storage pool and/or the performance characteristics of the new child virtual machines.

In at least one of the various embodiments, input/output operations (IOP's) may monitored and collected by at least a IOPs monitoring process. In at least one of the various embodiments, the IOP's monitoring may be conducted by monitoring application 250 that may be on flexible storage provisioning device 118.

In at least one of the various embodiments, if performance metrics information for the new child virtual machine may have been collected for a designated period of time (e.g., ten days) the flexible storage provisioning system may have enough performance metrics to generate an accurate performance profile for the new child virtual machine.

In at least one of the various embodiments, if the new child virtual machine has been characterized, another storage pool may be selected for the new child virtual machine based on the performance profile of the new child virtual machine.

In at least one of the various embodiments, if a storage pool for the new child virtual machine may be selected, an appropriate time to transfer the child virtual machine storage from the high-speed SAN to selected storage pool may be determined. In at least one of the various embodiments, an appropriate time may be a time where the performance impact caused by moving the child virtual machine may be less than at other times.

Generalized Operation

FIGS. 5-8 represent the generalized formulas and operations for flexible storage provisioning in cloud-based architecture in accordance with at least one of the various embodiments. In at least one of the various embodiments, processes 500, 700, and 800 described in conjunction with FIGS. 5-8 may be implemented by and/or executed on a single network device, such as network device 200 of FIG. 2. In other embodiments, these processes or portions thereof, may be implemented by and/or executed on a plurality of network devices, such as network device 200 of FIG. 2. However, embodiments are not so limited and various combinations of network devices, server devices, blade servers, or the like may be utilized. Further, in at least one of the various embodiments, the processes described in conjunction with FIGS. 5-8 may be operative in flexible storage provisioning architectures such as those described in conjunction with FIG. 4.

Figure 5:
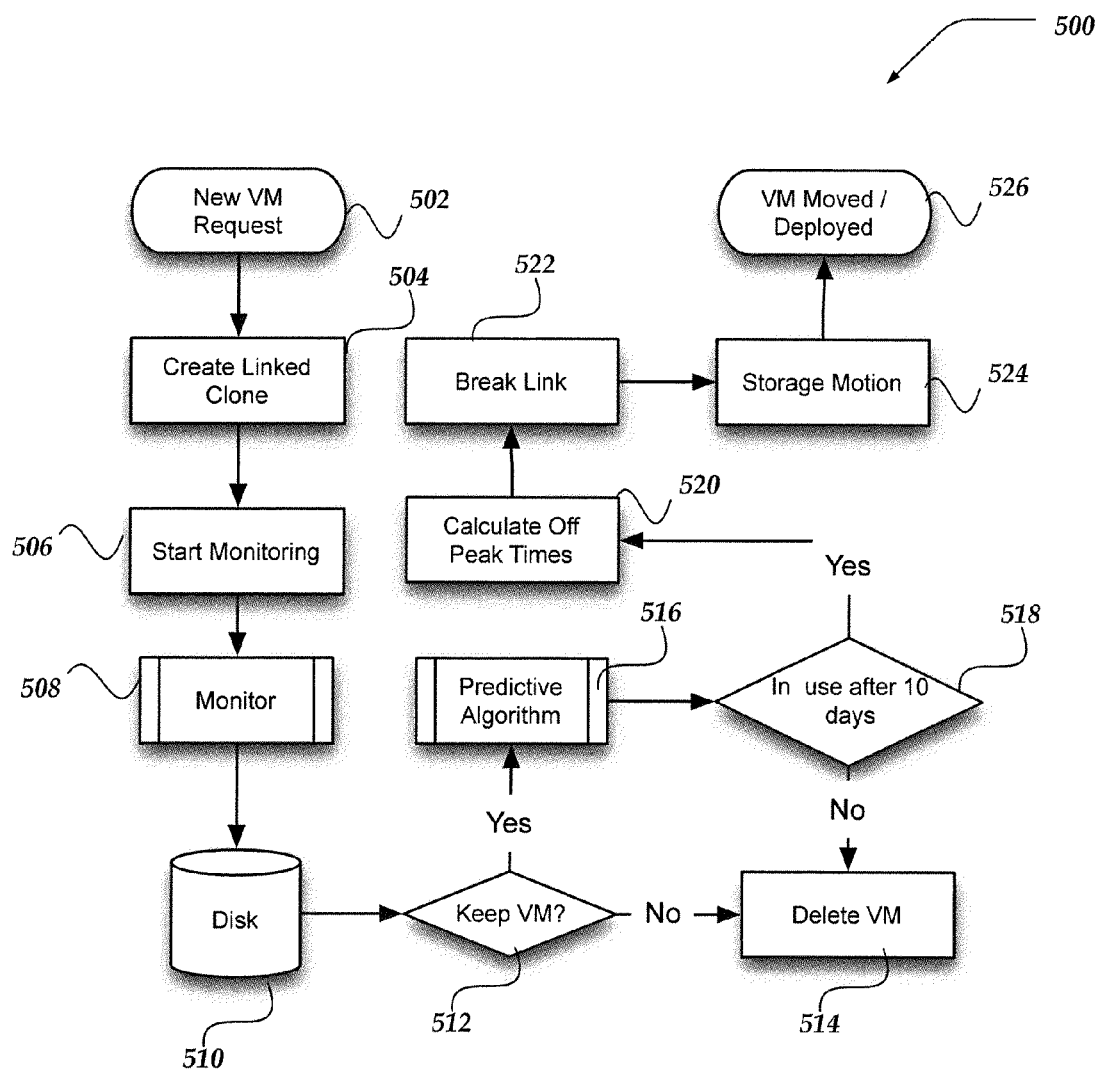
FIG. 5 shows a flow chart of a system adapted to perform actions in accordance with the embodiments.

FIG. 5 shows a flow chart of process 500 performing actions in accordance with at least one of the various the embodiments. At start block 502, in at least one of the various embodiments, a new virtual machine request may be received.

At block 504, in at least one of the various embodiments, based on the provided request a new linked child virtual machine may be created where the child virtual machine may be a clone of a parent virtual machine. At block 506, in at least one of the various embodiments, process 500 may start monitoring the new child virtual machine.

At block 508, in at least one of the various embodiments, the monitoring process may collect performance metrics.

At block 510, the collected storage metrics information may be stored in persistent storage, such as, a physical disk, a virtual disk, database, or the like.

At decision block 512, in at least one of the various embodiments, if a user or other process determines that the new virtual machine should be kept, control may move to block 516. Otherwise, in at least one of the various embodiments, control may move to block 514.

At block 514, the new child virtual machine may be deleted from the system. In at least one of the various embodiments, VM may be deleted if they are no longer in use after the monitoring time period has elapsed. For example, in at least one of the various embodiments, VM's may be created for short lived purposes or to handle short lived bursts of application activity. In this type of circumstance VM's that are no longer being used may be deleted. Or, in some cases, a user may direct that a VM be deleted.

In at least one of the various embodiments, VM's that are candidates for deletion may be placed in a list and/or queue and users may be notified that the VM may be a candidate for deletion. But in at least one of the various embodiments, the VM may stay operative unless a user confirms that the VM may be deleted.

At block 516, in at least one of the various embodiments, generate predictive metrics using a predictive algorithm. In at least one of the various embodiments, predictive metrics for the child VM may be computed to determine the type of storage pool the may be suited for the performance characteristics of the VM. Computations such as those illustrated in FIG. 6 may be employed to determine performance profile for the VM.

At decision block 518, in at least one of the various embodiments, if the child virtual machine remains in use after 10 days, control may flow to block 520. Otherwise, in at least one of the various embodiments, control may flow to bock 514 where the new child virtual machine may be deleted from the system.

In at least one of the various embodiments, rather than automatically deleting the child VM, the VM may be added to a list, or otherwise marked/flagged to indicate that it is a candidate for deletion. If a VM may be designated for deletion one or more users responsible for administering the VM may be provided notification that one or more VM may be available for deletion.

At block 520, in at least one of the various embodiments, the off peak times of the system and the new child virtual machine may be calculated. In at least one of the various embodiments, a monitoring application, such as, monitoring application 250, may be monitoring the operational characteristics of the cloud computing environment to determine a period of time where it may be advantageous to break the child VM's link with the parent VM.

In at least one of the various embodiments, considerations take into account the various components that may be affected by the transfer and de-linking operations, such as, the destination storage pool, the parent VM's storage pool, or the like. Also, additional considerations may include, network traffic within the cloud computing environment, application considerations (e.g., no transfer in the middle of of database transactions, or the like), business rules defined by a user, (e.g., users may define conditions such as no web requests received by VM for 10 minutes, or the like), storage distribution requirements (e.g., it may be critical to move the child VM to free up space on the parent VM's storage pool, or the like), time of day, or the like, or combinations thereof.

At block 522, in at least one of the various embodiments, the link between the child virtual machine and parent virtual machine may be broken.

At block 524, in at least one of the various embodiments, the child virtual machine may have its associated storage moved to a storage pool that may have been indicated by the predictive algorithm process. Next, at return block 526, since the deployment of the new virtual machine may be complete, control may be returned to a calling process.

FIG. 6 shows a table of expressions that may be for calculating virtual machine performance characteristics in accordance with at least one of the various embodiments. In at least one of the various embodiments, a new child virtual machine may be monitored to collect performance characteristics, such as, per second sum of disk size growth 602, per second sum of disk input 604, per second sum of disk output 606, per second sum of CPU usage 608, per second sum of memory usage 610, or the like.

In at least one of the various embodiments, formulas, such as, formulas 602-610 may be used to match the storage performance characteristics of a child virtual machine with a particular storage pool. In at least one of the various embodiments, a time period for monitoring may be selected based on user input, configuration files, or the like.

The formulas illustrated in FIG. 6 are depicted using a time period of 10 days (864000 seconds), other longer or shorter time periods may be selected without departing from the spirit of the innovations herein.

In at least one of the various embodiments, other metrics may be collected and applied to determine virtual machine performance characteristics, such as, number of processes, number of threads, network connections, number and/or type(s) of installed applications (e.g., databases, web servers, or the like), metrics versus time of day, or the like.

Figure 7:
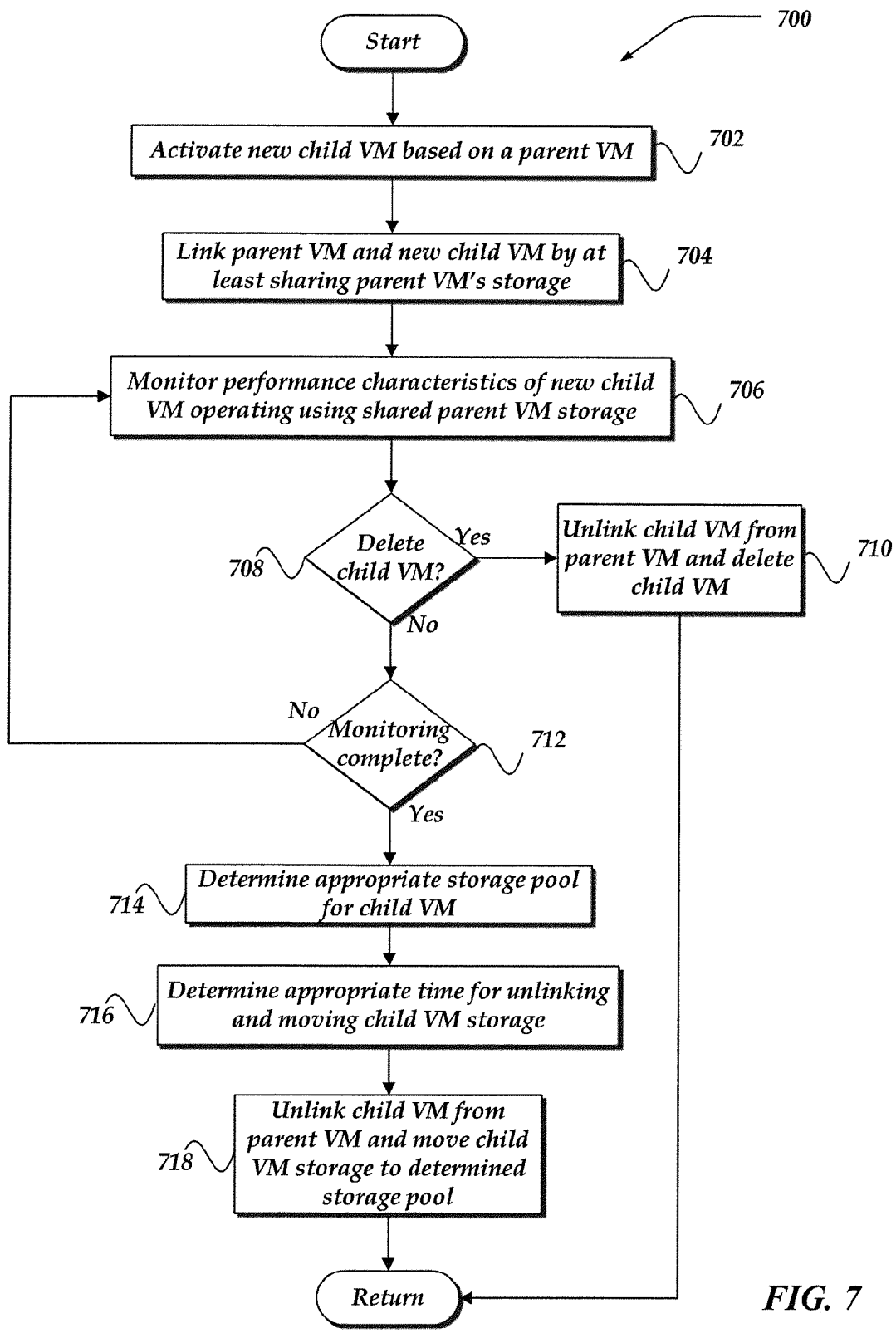
FIG. 7 shows a flowchart for a process for performing flexible storage provisioning in accordance with at least one of the various embodiments.

FIG. 7 shows a flowchart for process 700 for performing flexible storage provisioning in accordance with at least one of the various embodiments. After a start block, at block 702, in at least one of the various embodiments, a new child virtual machine based on a parent virtual machine may be activated. In at least one of the various embodiments, a parent virtual machine may be selected by a user for use as a template to generate a new child virtual machine.

In at least one of the various embodiments, child virtual machines may be cloned from other virtual machines that may have been designated as parent virtual machines. In at least one of the various embodiments, designating a virtual machine as a parent virtual machine may cause the system to transfer the storage for the new parent virtual machine to the high-speed SAN.

For example, if a virtual machine using storage allocated on a low performance storage pool may be designated as a parent virtual machine the storage for the parent may be moved to from the low performance storage pool to the high-speed SAN. In at least one of the various embodiments, the transferring the parent virtual machine storage to the high-speed SAN may be performed, on a scheduled basis, immediately, or the like.

In at least one of the various embodiments, a copy of the virtual machine designated to be a parent virtual machine may be moved to the high-speed SAN while the original virtual machine continues to use storage allocated on its original storage pool.

At block 704, in at least one of the various embodiments, the child virtual machine may be linked to the parent virtual machine. In at least one of the various embodiments, at least one element of being linked may be that the child virtual machine shares the storage space of its corresponding parent virtual machine. In at least one of the various embodiments, the child VM may share a portion of the storage allocated to its parent VM.

In at least one of the various embodiments, the child virtual machine may be a clone of the selected parent virtual machine. In at least one of the various embodiments, the child virtual machine may have the same operating systems, installed applications, configurations as the parent virtual machine.

In at least one of the various embodiments, linked child virtual machines may be operative very quickly because they may use the parent storage rather having to take the time to allocate new storage and/or copying large amounts of data into the new storage. In at least one of the various embodiments, if the child virtual machine may be activated the shared parent storage used by the child virtual machine may be located on a high-speed SAN.

In at least one of the various embodiments, child virtual machines may use the same virtual disks as their parent virtual machines. In at least one of the various embodiments, the virtual disk of the parent virtual machine may be cloned for use by the new child virtual machine. Also, in at least one of the various embodiments, cloning the parent virtual machine's virtual disk may enable the new child virtual machine to use the software that may be installed in the parent virtual machine. In at least one of the various embodiments, sharing software and/or other files with the parent virtual machine may enable the child virtual machine to use less disk space than if it may have duplicated copies of the software.

In at least one of the various embodiments, all files that may be included in the parent virtual machine at the time the child virtual machine may have been created may be available to the child virtual machine. Further, in at least one of the various embodiments, if the parent virtual machine's storage becomes inaccessible to the linked child virtual machine, the child virtual machine may become inoperative.

In at least one of the various embodiments, multiple child virtual machines may be spawned from the same parent virtual machine where the multiple child virtual machines may share the storage and software from the same parent virtual machine at the same time.

In at least one of the various embodiments, the cloned virtual disks that may be used by the one or more child virtual machines may be changed independently of the parent virtual machine without affecting the parent virtual machine's view of the virtual disk. Likewise, modifications made to the parent virtual machine's virtual disk after a child virtual machine may be cloned from that disk do not affect the child virtual machine's view of the data on its virtual disk.

In at least one of the various embodiments, if the child virtual machine's performance profile may be unknown to the system, associating the new child virtual machine with a shared storage located on a high performing high-speed SAN may ensure that the new child virtual machine may perform adequately during the monitoring period. For example, in at least one of the various embodiments, a new child virtual machine that requires a high-performance a storage pool may be perform adequately if the shared/linked storage may be on the high-performance SAN. Likewise, in at least one of the various embodiments, a new child virtual machine that requires low-performance storage may also be adequately served if the shared/liked storage may be on a high-performance storage pool. Thus, in at least one of the various embodiments, shared/linked storage located on the high-speed SAN, in some cases, may be under utilized by child virtual machines having low performance characteristics, the arrangement may be sufficient for handling new child virtual machines having high performance characteristics.

At block 706, in at least one of the various embodiments, the performance characteristics of the new child virtual machine may be monitored as it operates using the shared storage from its linked parent virtual machine. In at least one of the various embodiments, a monitoring application, such as, monitoring application 250, may record various performance characteristic on the new child VM as it performs actions on behalf of the application that is hosting relating to the application, such as, responding to web requests, processing queries, or the like.

In at least one of the various embodiments, the monitoring application may record the various performance characteristics of the child VM and may compile them into a performance profile that may be associated with the child VM.

At decision block 708, in at least one of the various embodiments, in some cases child virtual machines may be deleted while they may be linked to their corresponding parent. In at least one of the various embodiments, a child virtual machine may be deleted because the conditions that triggered the system and/or user to create the new child virtual machine may have passed.

For example, in at least one of the various embodiments, a child virtual machine may be spawned to handle an increase in load on one or more applications. If the load subsides the system and/or user may delete the child virtual machine if is no longer required. If the child virtual machine may be deleted, in at least one of the various embodiments, control may move to block 710. Otherwise, in at least one of the various embodiments, control may move to decision block 712.

At block 710, in at least one of the various embodiments, the child virtual machine may be unlinked from its corresponding parent virtual machine, shutdown, and deleted from the system. Next, in at least one of the various embodiments, if the child virtual machine is deleted, control may be returned to a calling process.

In at least one of the various embodiments, the child virtual machine may be placed in a queue for deletion and removed at a time that may be more convenient. In at least one of the various embodiments, a separate garbage-collection process may scan the system to delete child virtual machines that may be indicated as being ready for removal.

At decision block 712, in at least one of the various embodiments, monitoring of the performance metrics of the child virtual machine may continue for a determined period of time, such as, 24 hours, 3 days, 10 days, 30 days, or the like. In at least one of the various embodiments, the duration of the monitoring period may be set by a user, read from a configuration file, or the like. Also, in at least one of the various embodiments, users may set the monitoring duration for each child virtual machine individually.

In at least one of the various embodiments, if the monitoring period may be expired, control may move to block 714. Otherwise, in at least one of the various embodiments, control may loop back to block 706.

At block 714, in at least one of the various embodiments, based in part on the performance metrics collected during the monitoring period, the appropriate storage pool(s) for the child virtual machine may be determined. In at least one of the various embodiments, the performance metrics the child virtual machine and the performance characteristics of each available storage pool may be evaluated to determine where to allocate storage for the child virtual machine.

At block 716, in at least one of the various embodiments, an appropriate time for unlinking the child virtual machine storage from its parent virtual machine and moving it to the determined storage pool may be determined.

In at least one of the various embodiments, unlinking a child virtual machine from its corresponding parent virtual machine may include allocating space on the determined destination storage pool and moving and/or copying the child virtual machine image and associated data to the determined storage pool. In at least one of the various embodiments, moving a child virtual machine to the determined storage pool may impact performance of the operating child virtual machine, the target storage pool, the storage entire storage system, or the like.

For example, in at least one of the various embodiments, an appropriate time for moving the child virtual machine may be during off-peak times of usage of the child virtual machine, parent virtual machine, storage system, or the like.

Also, in at least one of the various embodiments, an appropriate time may be based on other factors such as immediacy of need, other scheduling concerns (e.g., the move may require specific personnel to be available to support the move), impending system maintenance, or the like.

At block 718, in at least one of the various embodiments, at the determined appropriate time the child virtual machine may be unlinked from the parent virtual machine and the storage for the child virtual machine may be allocated on the determined storage pool. Also, in at least one of the various embodiments, the storage for the child virtual machine that may comprise one or more components, including, an operating system, installed applications, virtualized memory images, virtualized disk storage, virtualized devices, or the like, may be moved and/or copied to the allocated storage space. Next, control may be returned to a calling process.

Figure 8:
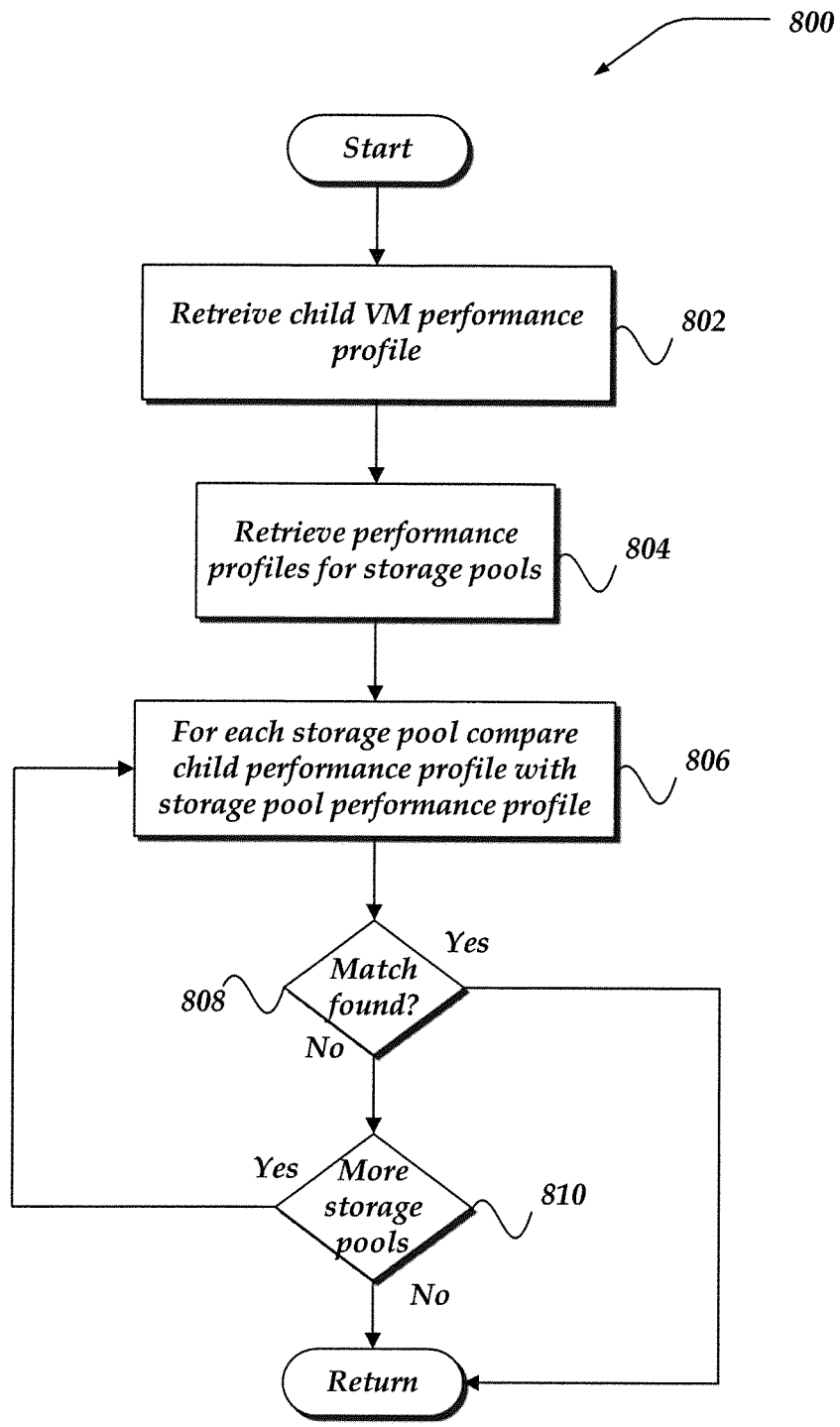
FIG. 8 shows a flowchart for a process for identifying the appropriate storage pool for a child virtual machine in accordance with at least one of the various embodiments.

FIG. 8 shows a flowchart for process 800 for identifying the appropriate storage pool for a child virtual machine in accordance with at least one of the various embodiments. After a start block, at block 802, in at least one of the various embodiments, the performance profile associated with the child virtual machine that may have been generated during a monitoring process may be provided to process 800.

At block 804, in at least one of the various embodiments, performance profiles associated with the available storage pools may be provided to process 800. In at least one of the various embodiments, provided performance profiles may be based on various metrics, including, recording the input and output operations associated with each storage pool. In at least one of the various embodiments, the input/output operations provide a running tally of the performance characteristics of each storage pool. In at least one of the various embodiments, the maximum input/output (e.g., MAXIO) and the average input/output (e.g., AVGIO) may be determined for each available storage pool.

At block 806, in at least one of the various embodiments, the performance profiles of each storage pool may be compared to the performance profile of the child virtual machine.

In at least one of the various embodiments, if the for a storage pool is greater than $((\text{DiskInput}_{Final}-\text{DiskInput}_{initial})+(\text{DiskOutput}_{Final}-\text{DiskOutput}_{initial}))$ and $((\text{DiskInput}_{Final}-\text{DiskInput}_{initial})+(\text{DiskOutput}_{Final}-\text{DiskOutput}_{initial}))$ is greater than AVGIO then the storage pool may be selected as the storage destination for the child virtual machine.

In at least one of the various embodiments, other criteria may be used to select a storage pool, including, service level agreements, cost of the storage pool, geographic location of the storage pool, rules or configurations associated with the child virtual machine, user preferences, security provisions, backup requirements, high-availability requirements, or the like.

In at least one of the various embodiments, policy driven business rules may introduce constraint that may influence the determination of the destination storage pool. For example, a business rule may establish a cost ceiling for one or more child virtual machine. Thus, if the determined destination storage pool is too expensive (e.g., it exceeds the established cost ceiling for this child virtual machine) a different less expensive storage pool may be selected even though its performance characteristics may not be ideal.

At decision block 808, in at least one of the various embodiments, if the storage pool having the appropriate characteristics may found, the identity of the appropriate storage pool may be communicated to the calling process and control may be returned to a calling process. Otherwise, in at least one of the various embodiments, control may move to decision block 810.

At decision block 810, in at least one of the various embodiments, if more storage pools remain to be evaluated, control may loop back to block 806. Otherwise, in at least one of the various embodiments, control may be returned to a calling process.

In at least one of the various embodiments, if an appropriate storage pool may be unavailable a user may be notified. In at least one of the various embodiments, the child virtual machine may be remain eligible for transfer to a storage pool if an appropriate storage pool may be identified later. Further, in at least one of the various embodiments, the child virtual machine may remain linked to the parent virtual machine and continue sharing storage with the parent virtual machine until the child virtual machine may be deleted by a user or an appropriate storage pool may become available.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed as new and desired to be protected by Letters Patent of the United States is:

1. A method for provisioning virtual machines over a cloud network, comprising:

monitoring a plurality of storage pools to determine a storage pool performance profile for each monitored storage pool;

classifying each of the plurality of storage pools as one of a high-speed storage pool, a medium-speed storage pools, or a slow-speed storage pools based on their corresponding storage pool performance profile;

activating a child virtual machine (VM) based on a clone of a parent VM located on the high-speed storage pool, wherein the child VM is linked to the parent VM and shares at least a portion of a storage partition associated with the parent VM;

monitoring at least one performance characteristic of the child VM for a defined time period to determine a child VM performance profile for the child VM; and upon expiration of the defined monitoring time period, performing further actions, including:

determining an off peak time for unlinking the child VM from the parent VM based on monitoring the at least one performance metric and one or more operational characteristics of the cloud network;

when the child VM is unused, employing a separate garbage-collection process to delete the child VM that is ready for removal from the cloud network; and when the child VM is used, performing further actions, including:

comparing the child VM performance profile with each storage pool performance profile;

determining a destination storage pool for the child VM based on the comparison, wherein a performance profile of the destination storage pool is consistent with the child VM performance profile;

while the child VM and the parent VM are executing, unlinking the child VM from the parent VM at the determined off peak time and allocating storage space for the child VM on the determined storage pool; and moving the child VM from the at least portion of the storage partition to the determined destination storage pool.

2. The method of claim 1, wherein upon expiration of the defined monitoring time period, further comprises enabling the child VM to be deleted by at least a user.

3. The method of claim 1, wherein linking the child VM to the parent VM further comprises, sharing at least one application with the child VM that is currently installed in the parent VM.

4. The method of claim 1, further comprising, classifying each storage pool in a ranked order based on one or more monitored performance metrics.

5. The method of claim 1, wherein the storage partition for the parent VM is located in a high performance storage pool.

6. The method of claim 1, wherein monitoring the child VM, further comprises, monitoring at least one performance metric, wherein the at least one performance metric includes at least one of a per second sum of disk growth, a per second sum of disk input, or a per second sum of disk output.

7. A system arranged for provisioning virtual machines over a cloud network, comprising:
a server device, comprising:
a transceiver that is operative to communicate over the network;
a memory that is operative to store at least instructions; and
a processor device that is operative to execute instructions that enable actions, including:
monitoring a plurality of storage pools to determine a storage pool performance profile for each monitored storage pool;
classifying each of the plurality of storage pools as one of a high-speed storage pool, a medium-speed storage pools, or a slow-speed storage pools based on their corresponding storage pool performance profile;
activating a child virtual machine (VM) based on a clone of a parent VM located on the high-speed storage pool, wherein the child VM is linked to the parent VM and shares at least a portion of a storage partition associated with the parent VM;
monitoring at least one performance characteristic of the child VM for a defined time period to determine a child VM performance profile for the child VM; and
upon expiration of the defined monitoring time period, enabling further actions, including:
determining an off peak time for unlinking the child VM from the parent VM based on monitoring at least one performance metric and one or more operational characteristics of the cloud network;
when the child VM is unused, employing a separate garbage-collection process to delete the child VM that is ready for removal from the cloud network; and
when the child VM is used, performing further actions, including:
comparing the child VM performance profile with each storage pool performance profile; and
determining a destination storage pool for the child VM based on the comparison, wherein a performance profile of the destination storage pool is consistent with the child VM performance profile;
while the child VM and the parent VM are executing, unlinking the child VM from the parent VM at the determined off peak time and allocating storage space for the child VM on the determined storage pool; and
moving the child VM from the at least portion of the storage partition to the determined destination storage pool; and
a client device, comprising:
a transceiver that is operative to communicate over the network;
a memory that is operative to store at least instructions; and
a processor device that is operative to execute instructions that enable actions, including, communicating with the server device to activate the child VM.

8. The system of claim 7, wherein upon expiration of the defined monitoring time period, further comprises enabling the child VM to be deleted by at least a user.

9. The system of claim 7, wherein linking the child VM to the parent VM further comprises, sharing at least one application with the child VM that is currently installed in the parent VM.

10. The system of claim 7, further comprising, classifying each storage pool in a ranked order based on one or more monitored performance metrics.

11. The system of claim 7, wherein the storage partition for the parent VM is located in a high performance storage pool.

12. The system of claim 7, wherein monitoring the child VM, further comprises, monitoring at least one performance metric, wherein the at least one performance metric includes at least one of a per second sum of disk growth, a per second sum of disk input, or a per second sum of disk output.

13. A processor readable non-transitory storage media that includes instructions for provisioning virtual machines over a network, wherein execution of the instructions by a processor device enables actions, comprising:
monitoring a plurality of storage pools to determine a storage pool performance profile for each monitored storage pool;
classifying each of the plurality of storage pools as one of a high-speed storage pool, a medium-speed storage pools, or a slow-speed storage pools based on their corresponding storage pool performance profile;
activating a child virtual machine (VM) based on a clone of a parent VM located on the high-speed storage pool, wherein the child VM is linked to the parent VM and shares at least a portion of a storage partition associated with the parent VM;
monitoring at least one performance characteristic of the child VM for a defined time period to determine a child VM performance profile for the child VM; and
upon expiration of the defined monitoring time period, enabling further actions, including:
determining an off peak time for unlinking the child VM from the parent VM based on monitoring at least one performance metric and one or more operational characteristics of the cloud network;
when the child VM is unused, employing a separate garbage-collection process to delete the child VM that is ready for removal from the cloud network; and
when the child VM is used, performing further actions, including:
comparing the child VM performance profile with each storage pool performance profile;
determining a destination storage pool for the child VM based on the comparison, wherein a performance profile of the destination storage pool is consistent with the child VM performance profile;
while the child VM and the parent VM are executing, unlinking the child VM from the parent VM at the determined off peak time and allocating storage space for the child VM on the determined storage pool; and
moving the child VM from the at least portion of the storage partition to the determined destination storage pool.

14. The media of claim 13, wherein upon expiration of the defined monitoring time period, further comprises enabling the child VM to be deleted by at least a user.

15. The media of claim 13, wherein linking the child VM to the parent VM further comprises, sharing at least one application with the child VM that is currently installed in the parent VM.

16. The media of claim 13, further comprising, classifying each storage pool in a ranked order based on one or more monitored performance metrics.

17. The media of claim 13, wherein the storage partition for the parent VM is located in a high performance storage pool.

18. The media of claim 13, wherein monitoring the child VM, further comprises, monitoring at least one performance metric, wherein the at least one performance metric includes at least one of a per second sum of disk growth, a per second sum of disk input, or a per second sum of disk output.

* * * * *